(12) United States Patent
   Zhang

(10) Patent No.: US 12,600,286 B1
(45) Date of Patent: Apr. 14, 2026

(54) MODULAR HAND-HELD LOCKING CLASP ASSEMBLY WITH FRICTION SELF-LOCKING MECHANISM

(71) Applicant: Zhangjiagang SMK MFG. Co., Ltd, Zhangjiagang (CN)

(72) Inventor: Jinhui Zhang, zhangJiangang (CN)

(73) Assignee: Zhangjiagang SMK MFG. Co., Ltd, Zhangjiagang (CN)

( * ) Notice: Subject to any disclaimer, the term of this patent is extended or adjusted under 35 U.S.C. 154(b) by 0 days.

(21) Appl. No.: 19/401,889

(22) Filed: Nov. 26, 2025

(51) Int. Cl.
   B60P 7/08 (2006.01)

(52) U.S. Cl.
   CPC ................................. B60P 7/0823 (2013.01)

(58) Field of Classification Search
   CPC ...................................................... B60P 7/0823
   See application file for complete search history.

(56) References Cited

U.S. PATENT DOCUMENTS

| | | | | |
|---|---|---|---|---|
| 5,271,606 A | * | 12/1993 | Kamper | B60P 7/083 |
| | | | | 254/217 |
| 8,651,509 B1 | * | 2/2014 | Huang | B60D 1/185 |
| | | | | 280/480.1 |
| 8,905,379 B2 | * | 12/2014 | Huang | B60P 7/0846 |
| | | | | 254/218 |
| 9,862,300 B1 | * | 1/2018 | Anderson | B60P 7/0846 |
| D861,448 S | * | 10/2019 | Zhang | D8/44 |
| 2003/0145434 A1 | * | 8/2003 | Lin | B60P 7/0823 |
| | | | | 24/68 CD |
| 2004/0084558 A1 | * | 5/2004 | Huang | B65H 54/585 |
| | | | | 242/385.4 |
| 2009/0119892 A1 | * | 5/2009 | Breeden | B60P 7/083 |
| | | | | 24/68 CD |
| 2012/0167707 A1 | * | 7/2012 | Chang | F16G 11/12 |
| | | | | 74/491 |
| 2025/0360847 A1 | * | 11/2025 | Coffman | A44B 11/125 |

* cited by examiner

*Primary Examiner* — David M Upchurch

(57) ABSTRACT

A hand-held locking clasp assembly and modular tensioning device are disclosed. The hand-held locking clasp assembly employs a unique friction self-locking mechanism for uni-directional strap retention and controlled release. A strap locking mechanism, comprising a locking press pin, locking pressure plate, pressure plate strap engagement wedge, and press pin bearing in concert with a reset spring and linkage control mechanism, enables flexible switching between locked and unlocked states. Unlike conventional clasps offering only passive recovery, the present invention features enhanced friction engagement and modular remov-able-connection design, improving user experience and safety. The strap reel module incorporates a spring-loaded reel winch providing slack strap recovery exclusively during the unlocked state through dovetail guide post and groove connections. The complete system demonstrates synergistic cooperation during preliminary fixation and progressive tightening, avoiding passive auto-tightening risks of prior art. The invention substantially enhances tightening preci-sion, user feedback, and strap protection.

15 Claims, 10 Drawing Sheets

72    71    73

MODULAR HAND-HELD LOCKING CLASP ASSEMBLY WITH FRICTION SELF-LOCKING MECHANISM

TECHNICAL FIELD

The present invention relates to an automotive safety tensioning device, and more particularly to a hand-held locking clasp assembly and modular tensioning system for securing and fastening cargo on vehicles, trailers, aircraft, ships, and other transport vehicles. The device provides reliable constraint of cargo during transport and belongs to the technical field of cargo securing and retention systems. The core innovation of the present invention resides in a unique friction self-locking mechanism and modular connection design, upgrading traditional simple clasps to a novel tensioning system featuring bidirectional control (locked/unlocked states) and structural modularity.

BACKGROUND OF THE INVENTION

Conventional simple clasp designs employ a minimalist structure comprising only a basic clasp body configured with a strap. In typical use, a user wraps the strap around an object to be secured, forming a closed loop, with one end of the strap fixed to the tail of the clasp and the other end threaded through the clasp to complete the closed loop. By pulling the free end of the strap extending from the clasp and exploiting the unidirectional passage characteristic of the clasp, the strap is progressively tightened to constrain the cargo. However, this design suffers from significant deficiencies. First, the tightening effectiveness is poor. Relying on only a single contact point between the strap and clasp for constraint, the friction force is limited, requiring excessive pulling force during tightening, which readily causes strap slippage and results in poor user experience. Second, the risk of damage is high: excessive pulling force causes severe friction between the strap and secured object, readily scratching or denting cargo surfaces, while insufficient pulling force fails to achieve effective tightening. Third, exposed strap suffers readily from damage. The strap remains continuously exposed externally, contacting the environment and experiencing wear, deterioration, and moisture damage, severely reducing service life. Fourth, operational experience is poor. Existing clasps cannot flexibly switch between locked and unlocked states, preventing users from performing incremental tightening adjustments: the entire tightening process must be completed in a single operation, which is disadvantageous for staged fixation.

The deficiencies of the prior art can be synthesized into two levels of problems. At the structural level, existing clasps employ passive unidirectional mechanisms lacking optimization of multi-point contact friction surfaces, resulting in insufficient tightening stability and control precision. The strap winding mechanism is absent, causing the strap to remain exposed externally for extended periods. The integration of clasp and reel components is minimal, with most designs employing monolithic fixed configurations unfavorable to maintenance and functional upgrades. At the functional level, existing designs cannot provide active locked/unlocked state switching; the overall approach is overly passive and cannot satisfy the dual requirements of safety constraint and flexible control during transport. The present invention addresses these problems by proposing the following technical requirements: (1) design a strap locking mechanism with multi-point friction surfaces enabling flexible switched between locked/unlocked states with non-damaging tightening: (2) achieve strap recovery through an independent spring-loaded reel winch structure, while limiting recovery force to act only on slack strap without actively tightening cargo: (3) employ a modular interface (such as dovetail guide posts and dovetail guide grooves) enabling flexible removable connection between the hand-held clasp and reel components: (4) achieve overall system performance enhancement through synergistic combination of friction self-locking mechanism and modular reel subsystem.

The present invention implements the following technical solutions to resolve these problems: First, design a strap locking mechanism with multi-point friction surfaces: a locking press pin with an outer surface uniformly formed with protrusions cooperates with a locking pressure plate having a lower surface formed with a pressure plate strap engagement wedge comprising multiple conical columns. Through reset spring biasing and linkage and control mechanism switching, the strap achieves multi-point securing in the locked state and free passage in the unlocked state, thereby substantially enhancing friction locking force. The tightening process becomes more controllable, requiring no excessive pulling force, effectively reducing damage risk to secured cargo. Second, design a modular strap reel subsystem: a strap reel module comprising a spring-loaded reel winch in combination with left and right spring reel covers provides passive recovery force for the strap through an internal return spring. Slack strap recovery occurs exclusively during the unlocked state of the hand-held clasp assembly, causing excess strap to be automatically retracted into the interior of the reel module, preventing strap exposure to wear and deterioration. Third, employ a modular interface design using dovetail guide posts and dovetail guide grooves, enabling flexible removable connection between the hand-held clasp assembly and strap reel module, enhancing system maintainability and upgrade potential. Finally, through organic combination of the three aforementioned aspects, the present invention achieves synergistic effect between the friction self-locking mechanism and modular reel subsystem, enabling the complete system to achieve significant functional enhancements in preliminary fixation, progressive tightening, and strap protection.

SUMMARY OF THE INVENTION

The present invention provides a hand-held locking clasp assembly and modular tensioning device that, through a unique friction self-locking mechanism and modular interface design, achieves multi-stage, non-damaging constraint of cargo.

The hand-held locking clasp assembly (11) comprises a housing formed by left and right shell bodies, a mounting point (31) positioned at the front end, a strap locking mechanism (40) disposed within the housing, and a linkage and control mechanism (50). The tail portion of the housing is provided with a dovetail guide post (21) configured to cooperate with a dovetail guide groove (22) of the strap reel module (12), enabling modular removable connection.

The strap locking mechanism (40) comprises the following components:

Locking Press Pin (41): The locking press pin (41) is rotatably mounted on a press pin guide post (42) via a press pin bearing (47). The outer surface of the locking press pin (41) is uniformly formed with protrusions that, upon contact with a strap passing over the surface, create a multi-point friction surface, significantly enhancing friction force. Compared to conventional single-point contact designs, the multi-point friction surface makes the tightening process more controllable and avoids functional failure resulting from wear of a single contact point.

Locking Pressure Plate (43): The locking pressure plate (43) is pivotally supported within the housing by a pressure plate guide post (44). Its lower surface is formed with a pressure plate strap engagement wedge (45) comprising multiple uniformly distributed conical columns. The locking pressure plate (43) and locking press pin (41) jointly clamp the strap passing therebetween. When the conical columns of the pressure plate strap engagement wedge (45) contact the protrusions on the surface of the locking press pin (41), a three-dimensional friction network is formed, subjecting the strap to multi-dimensional constraint during the tightening process.

Reset Spring (61) and Pressure Plate Stop Plate (46): The reset spring (61) has one end resting on a spring guide post (33) within the housing and the other end resting on the lower end of the pressure plate stop plate (46), continuously biasing the locking pressure plate (43) toward the locking press pin (41). This design ensures the two components automatically maintain tight contact in a static state, guaranteeing stable strap locking in the locked state.

The locked/unlocked state switching of the strap locking mechanism (40) is accomplished by the following linkage and control mechanism (50):

Control Trigger (51): The user operates the control triggers (51) (positioned symmetrically at both sides of the housing exterior) to drive the entire unlock process. The control triggers (51) are fixedly connected to the control push rod (52).

Control Push Rod (52), Push Rod Linkage Plate (53), and Linkage Pin (54): The control push rod (52) passes through the interior of the housing, with its both ends respectively connected to two circular slot-form push rod linkage plates (53). Each push rod linkage plate (53) has a circular hole at one end configured to engage with the control push rod (52) and a semicircular hole at the other end configured to nest with semicircular ends of the linkage pin (54) disposed within a linkage guide slot (35) of the housing. When the user operates the control triggers (51), the control push rod (52) is pulled, and through the oscillating linkage motion of the push rod linkage plate (53) and linkage pin (54), the locking pressure plate (43) is finally driven to separate from the locking press pin (41), allowing the strap to pass freely—this is the unlocked state.

Reset Process: When the user releases the control triggers (51), the elastic force of the reset spring (61) automatically restores the locking pressure plate (43) to its proximity with the locking press pin (41), re-clamping the strap—this is the locked state.

Positioning and Installation Structure: A positioning pressure head (63) is mounted within a pressure head installation slot (32) of the housing. The positioning pressure head (63) internally comprises a spring with a sphere positioned at its opening. The spring continuously biases the sphere to provide positioning and retention functions when performing dovetail insertion with the strap reel module (12).

The strap reel module (12) comprises a left spring reel cover (72), a right spring reel cover (73), and a spring-loaded reel winch (71) disposed therebetween. An inner surface of the left spring reel cover (72) is provided with a spring reel arbor shaft (74), upon which the spring-loaded reel winch (71) is mounted for coaxial rotation. The strap is uniformly wound around the outer periphery of the spring-loaded reel winch (71), which is provided with a strap fixed axle (75) for securing one end of the strap and a spring reel retaining clip (76) for securing the internal return spring.

The present invention provides explicit functional limitation of the spring-loaded reel winch (71), which is the key to avoiding equivalency risks associated with passive automatic strap-recovery devices:

The spring-loaded reel winch (71) provides passive recovery force for slack strap exclusively when the hand-held locking clasp assembly is in the unlocked state. When the hand-held locking clasp assembly is in the locked state, the recovery force provided by the return spring is completely counteracted by the holding force generated by the friction self-locking mechanism, unable to drag the strap.

The recovery force is explicitly limited to be insufficient to overcome the holding force exerted by the strap locking mechanism on the strap in the locked state. This means that final cargo tightening is not completed by active driving of the spring-loaded reel winch, but rather by the user pulling the free end of the strap and utilizing the friction self-locking mechanism. The spring-loaded reel winch serves only an auxiliary function: during the unlocked state, it automatically retracts excess slack strap into the interior of the reel module, preventing strap exposure.

Dovetail guide grooves (22) are formed at the front ends of the left spring reel cover (72) and right spring reel cover (73), each defining a quarter-circle opening configured to cooperate with the dovetail guide post (21) at the tail of the housing of the hand-held locking clasp assembly (11) and the sphere within the positioning pressure head (63), achieving dovetail insertion positioning. Additionally, connection mounting slots (77) are disposed on the left spring reel cover (72) and/or right spring reel cover (73) to cooperate with corresponding fixed structures of the hand-held locking clasp assembly, restricting relative rotation and enhancing assembly stability. Through this design, the hand-held locking clasp assembly (11) and strap reel module (12) achieve flexible removable connection.

The present invention achieves significant synergistic effects through organic combination of the hand-held locking clasp assembly and strap reel module:

Preliminary Fixation Stage: The user hangs the hook on the strap to a first fixed point and sets the hand-held locking clasp assembly to the unlocked state. At this stage, the spring-loaded reel winch is unobstructed by the strap locking mechanism and can passively recover the extended strap, automatically retracting excess strap. During this stage, the strap reel module (12) fully demonstrates its auxiliary function.

Progressive Tightening Stage: The user switches the hand-held locking clasp assembly to the locked state, and the friction self-locking mechanism takes control of the strap, causing it to be progressively tightened through manual pulling. Simultaneously, the passive recovery force of the spring-loaded reel winch is counteracted by the friction self-locking mechanism, preventing active tightening and eliminating the "automatic strap-recovery" risk.

Strap Protection: Since excess strap is automatically retracted by the spring-loaded reel winch (71) into the cavity formed between the left spring reel cover (72) and right spring reel cover (73), the strap is no longer exposed externally, substantially enhancing its protection and extending service life.

Modular Advantages: Through the modular interface of the dovetail guide post (21) and dovetail guide groove (22), the hand-held locking clasp assembly and strap reel module can be flexibly connected and disconnected, facilitating maintenance, cleaning, upgrades, or functional customization, enhancing overall system competitiveness.

This innovative combination of structural design and operational mechanism ensures that the present invention achieves significant enhancements compared to existing technology in preliminary fixation, progressive tightening, strap protection, and user experience, exemplifying the creative combination design concept of "1+1>2.".

BRIEF DESCRIPTION OF DRAWINGS

To more clearly illustrate the technical solution of embodiments of the present invention, a brief description of the accompanying drawings is provided below. In the following description, the same reference numerals represent the same or corresponding components. It should be understood that the accompanying drawings below illustrate only certain embodiments of the present invention, and other drawings may be obtained by persons ordinarily skilled in the art without creative effort.

Figure 1:
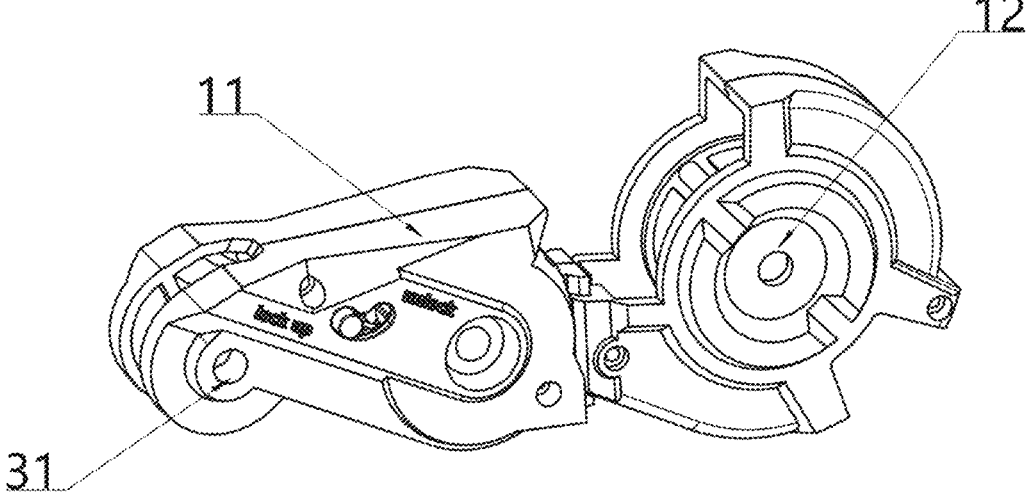
FIG. 1: Overall appearance schematic diagram of the present invention.
Figure 2:
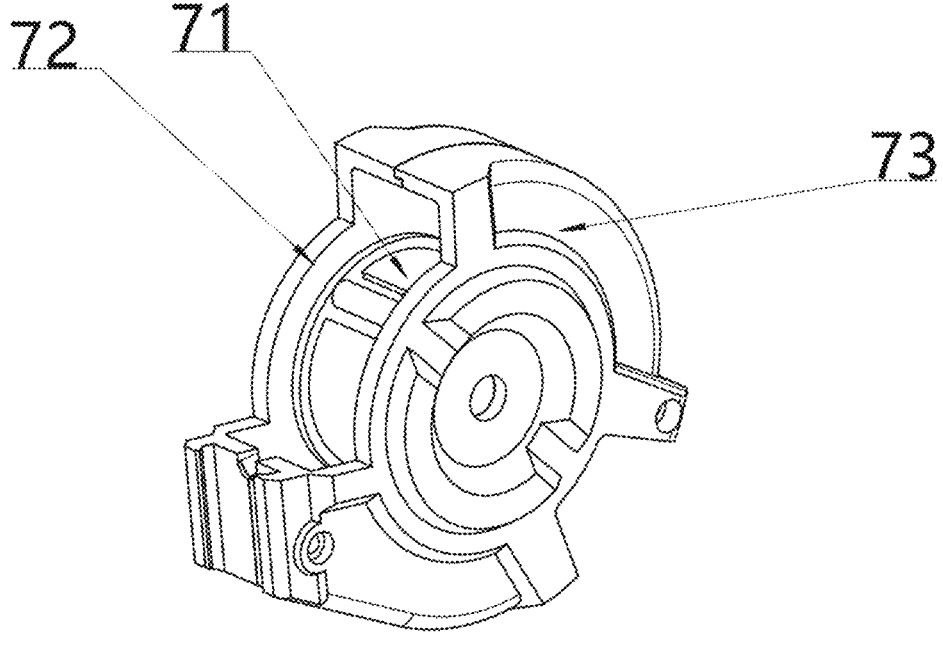
FIG. 2: Structural schematic diagram of the strap reel module (12).
Figure 3:
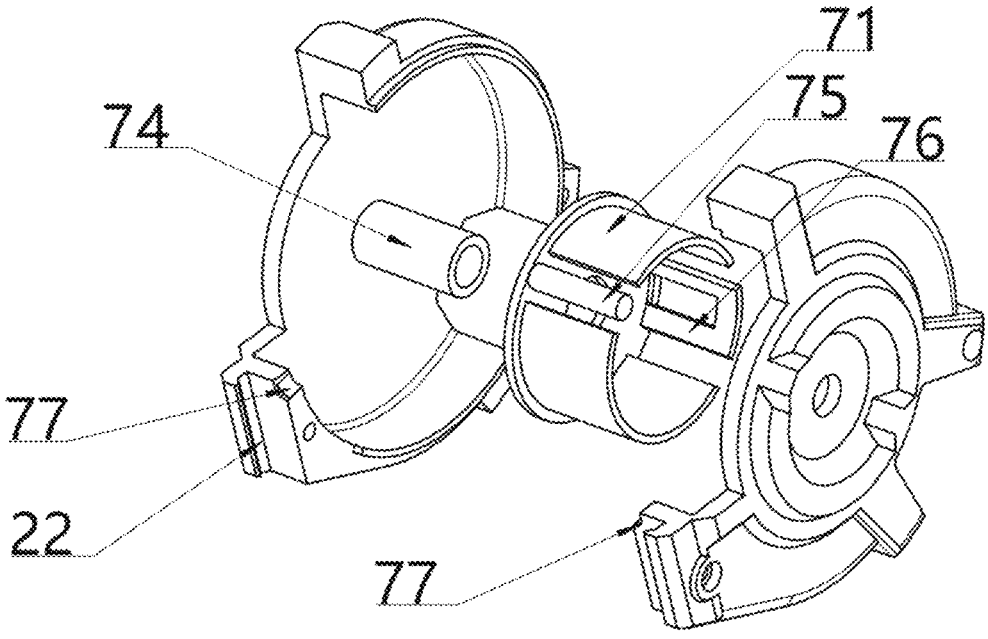
FIG. 3: Detailed internal schematic diagram of the strap reel module (12).
Figure 4:
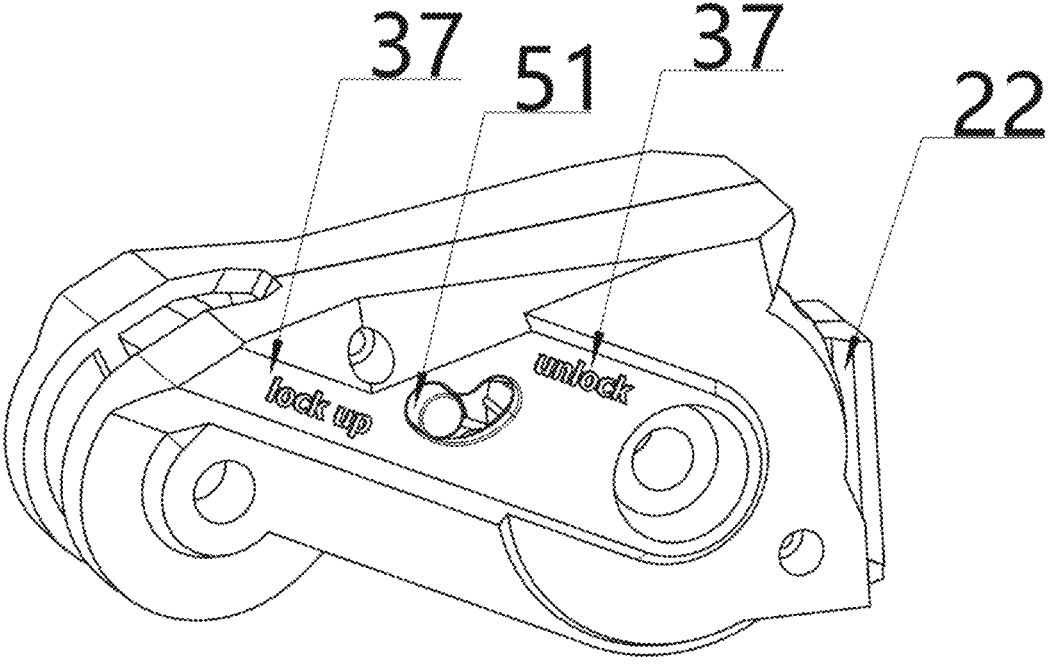
FIG. 4: Front view appearance and human-machine interface schematic diagram of the hand-held locking clasp assembly (11).
Figure 5:
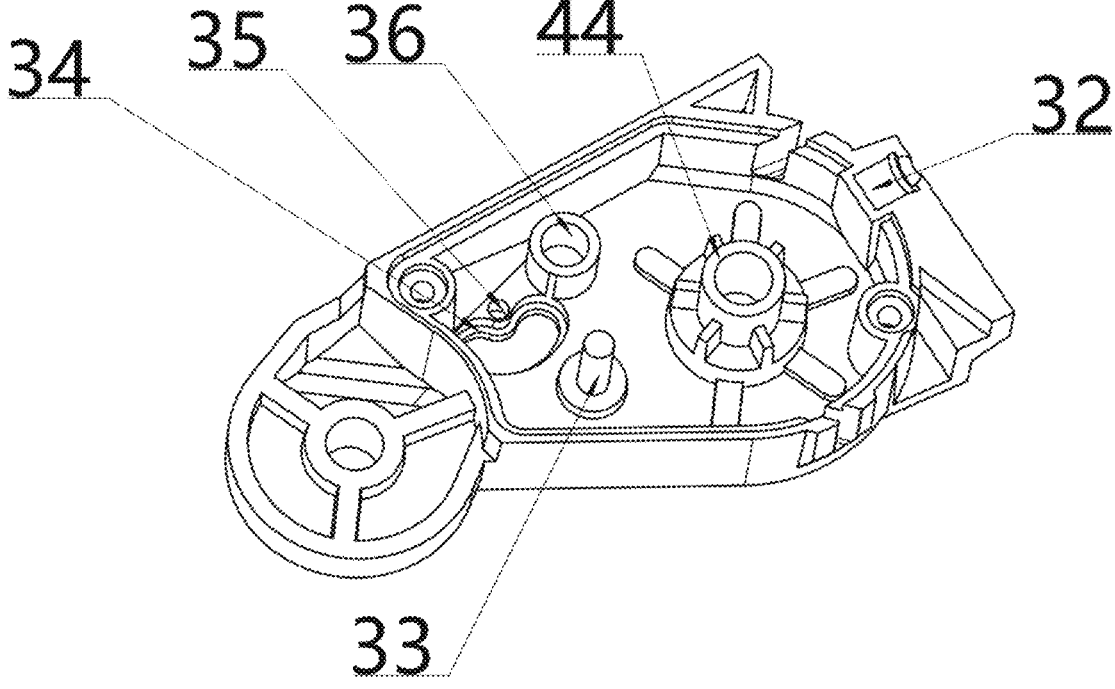
FIG. 5: Housing internal installation interface schematic diagram of the hand-held locking clasp assembly (11).
Figure 6:
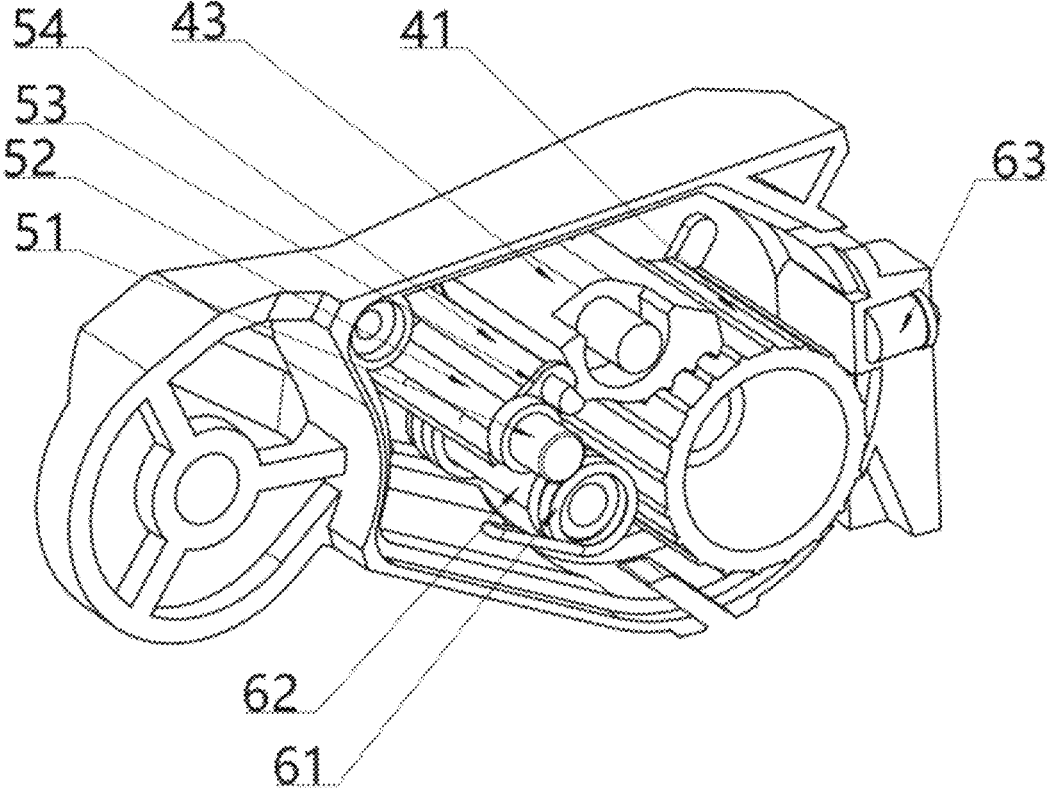
FIG. 6: Locking/unlocking linkage mechanism assembly schematic diagram.
Figure 7:
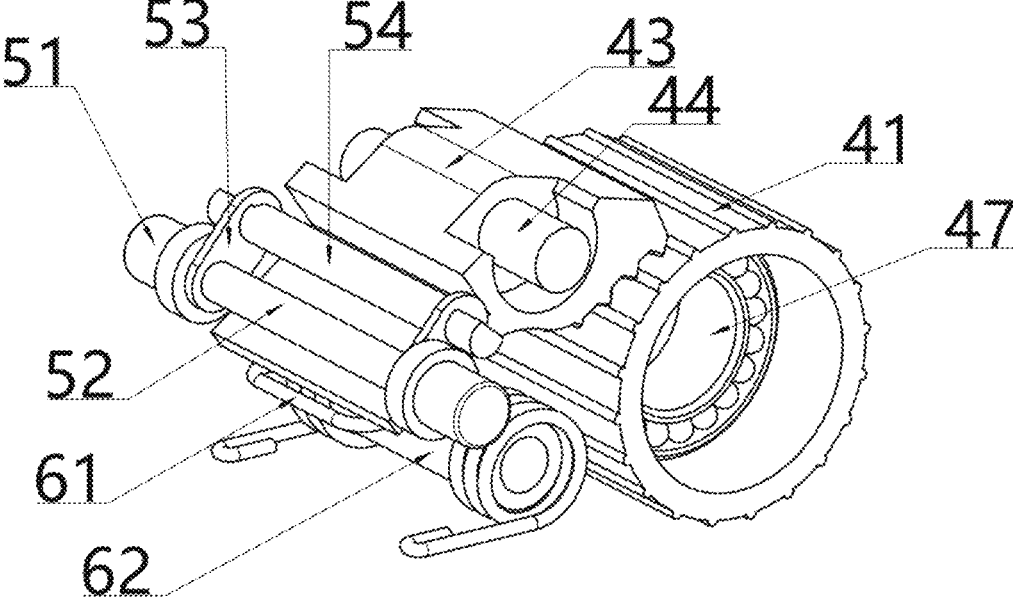
FIG. 7: Locking mechanism support and guidance detail schematic diagram.
Figure 8:
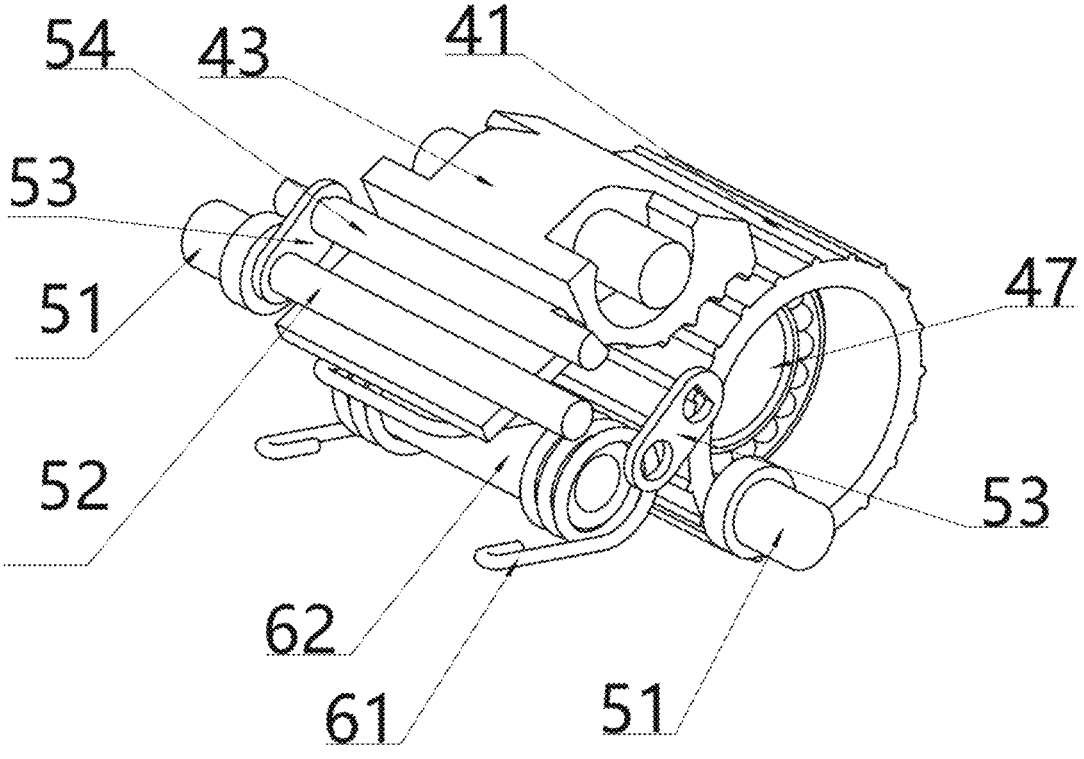
FIG. 8: Mechanism action schematic diagram of locked/unlocked state switching.
Figure 9:
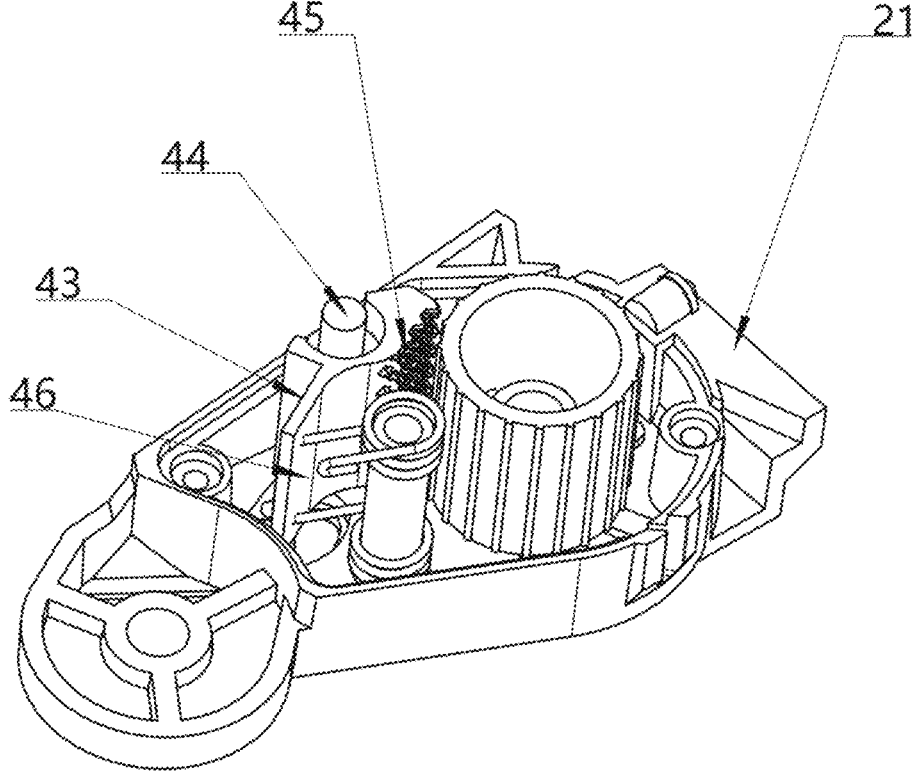
FIG. 9: Detailed schematic diagram of the friction self-locking core contact region.
Figure 10:
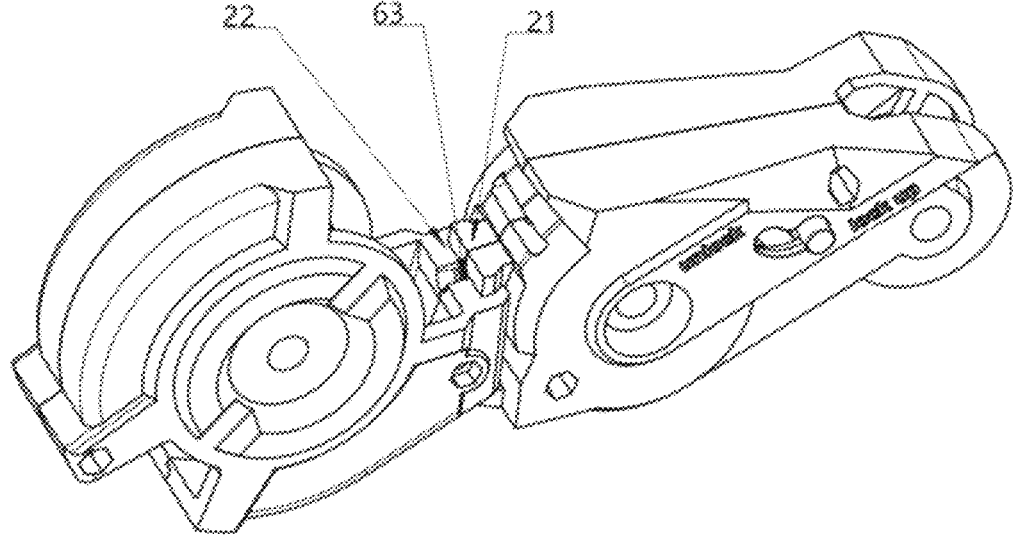
FIG. 10: Modular docking and positioning schematic diagram.

Reference Numerals: hand-held locking clasp assembly (11): strap reel module (12); dovetail guide post (21): dovetail guide groove (22): mounting point (31): pressure head installation slot (32): spring guide post (33): control slide groove (34): linkage guide slot (35); pressure plate guide slot (36): status indicator (37): locking press pin (41): press pin guide post (42): locking pressure plate (43): pressure plate guide post (44): pressure plate strap engagement wedge (45): pressure plate stop plate (46): press pin bearing (47): control trigger (51): control push rod (52): push rod linkage plate (53): linkage pin (54): reset spring (61): reset spring sleeve post (62): positioning pressure head (63): spring-loaded reel winch (71): left spring reel cover (72): right spring reel cover (73): spring reel arbor shaft (74): strap fixed axle (75): spring reel retaining clip (76): connection mounting slot (77).

DETAILED DESCRIPTION OF THE INVENTION

To make the objectives, technical solutions, and advantages of the present invention more clear and apparent, the following detailed description of the present invention is provided in conjunction with the accompanying drawings and specific implementation embodiments.

The accompanying drawings in the specific embodiments of the present invention will be combined below to provide a clear and complete description of the technical solutions in the embodiments of the present invention. It is apparent that the described embodiments are merely some embodiments of the present invention, not all embodiments thereof. Based on the embodiments of the present invention, all other embodiments obtained by persons skilled in the art without creative effort fall within the protection scope of the present invention.

In the description of the present invention, it should be understood that terms such as "center," "longitudinal," "transverse," "length," "width," "thickness," "upper," "lower," "front," "rear," "left," "right," "vertical," "horizontal," "top," "bottom," "inside," "outside," "clockwise," "counterclockwise," and the like indicate directions or positional relationships based on the directions or positional relationships described in the accompanying drawings. These terms are merely for convenience in describing the present invention and simplifying the description, and do not indicate or imply that the referred device or element must have a specific orientation or be constructed and operated in a specific manner. Therefore, these terms should not be understood as limiting the present invention.

Furthermore, the terms "first" and "second" are used for descriptive purposes only and should not be understood as indicating or implying relative importance or implying the quantity of the technical features indicated. Accordingly, features defined as "first" and "second" may explicitly or implicitly include one or more such features. In the description of the present invention, the meaning of "multiple" is two or more, unless otherwise explicitly and specifically limited.

In the present invention, unless otherwise explicitly provided and limited, terms such as "installation," "connection," "linked," and "fixed" should be broadly understood. For example, they may indicate connection, removable connection, or integration as a unit: they may indicate mechanical connection or electrical connection: they may indicate direct connection or indirect connection through an intermediate medium, or may indicate internal connection or mutual action between two elements. For persons skilled in the art, the specific meanings of the above terms in the present invention can be understood according to specific circumstances.

In the present invention, unless otherwise explicitly provided and limited, a first feature being "above" or "below" a second feature may include the first and second features being in direct contact, or may include the first and second features not being in direct contact but contacting through other features between them. Moreover, the first feature being "above," "above," or "on top of" the second feature includes the first feature being directly above or diagonally above the second feature, or merely indicates that the first feature has a greater horizontal height than the second feature. The first feature being "below," "below," or "beneath" the second feature includes the first feature being directly below or diagonally below the second feature, or merely indicates that the first feature has a lesser horizontal height than the second feature.

In the description of the present specification, references to "one embodiment," "some embodiments," "examples," "specific examples," or "some examples" indicate that specific features, structures, materials, or characteristics described in conjunction with the embodiments or examples are contained in at least one embodiment or example of the present invention. In the present specification, indicative expressions of the above terms should not be understood as necessarily referring to the same embodiment or example. Moreover, the described specific features, structures, materials, or characteristics may be appropriately combined in any one or more embodiments or examples.

Referring to the accompanying drawings, the hand-held tensioning device provided by the present invention comprises two main components: a hand-held locking clasp assembly (11) and a strap reel module (12). The two are connected through a dovetail guide post (21) and a dovetail guide groove (22) to form a modular removable connection. The housing (30) of the hand-held locking clasp assembly (11) is formed by left and right shell bodies, with a mounting point (31) disposed at the front end and a dovetail guide post (21) disposed at the tail end. The interior of the housing contains a strap locking mechanism (40) and a linkage and control mechanism (50), which function to achieve locking and releasing switching of the strap. The strap reel module (12) comprises a left spring reel cover (72), a right spring reel cover (73), and a spring-loaded reel winch (71). The dovetail guide grooves (22) at the front end of the strap reel module cooperate with the dovetail guide post (21) of the hand-held locking clasp assembly (11).

The strap locking mechanism (40) is constituted through cooperation of a locking press pin (41), a locking pressure plate (43), a pressure plate strap engagement wedge (45), a reset spring (61), and related components.

The locking press pin (41) is rotatably mounted on a press pin guide post (42) through a press pin bearing (47). Its outer surface is uniformly formed with protrusions configured to contact the strap and form a multi-point friction surface. The locking pressure plate (43) is pivotally supported within the housing by a pressure plate guide post (44). Its lower surface forms a pressure plate strap engagement wedge (45) comprising multiple uniformly distributed conical columns that cooperate with the protrusions on the surface of the locking press pin (41) to jointly form a three-dimensional friction locking network. The reset spring (61) has one end resting on a spring guide post (33) within the housing and the other end resting on the lower end of the pressure plate stop plate (46), continuously biasing the locking pressure plate (43) toward the locking press pin (41) and ensuring tight contact between the two components in a static state.

The linkage and control mechanism (50) includes four main components: a control trigger (51), a control push rod (52), a push rod linkage plate (53), and a linkage pin (54).

The control triggers (51) are symmetrically disposed along both sides of the housing and are fixedly connected to the control push rod (52). The control push rod (52) passes through the interior of the housing, with its both ends respectively connected to two circular slot-form push rod linkage plates (53). Each push rod linkage plate (53) has a circular hole at one end configured to cooperate with the control push rod (52) and a semicircular hole at the other end that nests with semicircular ends of the linkage pin (54) disposed within a linkage guide slot (35) of the housing.

When a user operates the control triggers (51), the control push rod (52) is pulled, and through the oscillating linkage mechanism of the push rod linkage plate (53) and linkage pin (54), the locking pressure plate (43) is driven to separate from the locking press pin (41), enabling the strap to pass freely and achieving the unlocked state. When the user releases the control triggers (51), the elastic force of the reset spring (61) automatically restores the system to its initial position, the locking pressure plate (43) returns to proximity with the locking press pin (41) and re-clamps the strap, entering the locked state.

A positioning pressure head (63) is mounted within a pressure head installation slot (32) of the housing. Its interior is provided with a spring, and a sphere is disposed at the opening. The spring continuously biases the sphere to provide positioning, retention against separation, and safety locking functions when performing dovetail insertion with the strap reel module (12).

A bolt is fixedly mounted at the center of the mounting point (31) at the front end of the housing, with a hook disposed on the bolt for hanging engagement with a secured object or fixed point.

A status indicator (37) corresponding to the control triggers (51) is disposed on the outer surface of the housing to enable users to identify whether the current state is locked or unlocked.

The strap reel module (12) comprises a left spring reel cover (72), a right spring reel cover (73), and a spring-loaded reel winch (71) disposed therebetween. An inner surface of the left spring reel cover (72) is provided with a spring reel arbor shaft (74), upon which the spring-loaded reel winch (71) is mounted for coaxial rotation. The strap is uniformly wound around the outer periphery of the spring-loaded reel winch (71), which is provided with a strap fixed axle (75) for securing one end of the strap and a spring reel retaining clip (76) for securing and limiting the internal return spring.

The spring-loaded reel winch (71) is explicitly limited to: provide passive recovery force for slack strap exclusively when the hand-held locking clasp assembly (11) is in the unlocked state. When the hand-held locking clasp assembly is in the locked state, the holding force exerted by the strap locking mechanism (40) on the strap completely counteracts the recovery force of the spring-loaded reel winch (71), preventing it from dragging the strap. This design ensures that cargo tightening is accomplished through manual strap pulling by the user utilizing the friction self-locking mechanism, rather than through active driving of the spring-loaded reel winch (71). The passive recovery function of the spring-loaded reel winch (71) in the unlocked state serves an auxiliary role, automatically retracting excess slack strap into the cavity formed between the left spring reel cover (72) and right spring reel cover (73), effectively preventing strap exposure to wear.

Dovetail guide grooves (22) are disposed at the front ends of the left spring reel cover (72) and right spring reel cover (73), with quarter-circle openings formed within the grooves. These cooperate with the dovetail guide post (21) at the tail of the housing of the hand-held locking clasp assembly (11) and with the sphere within the positioning pressure head (63), achieving dovetail insertion positioning and retention against separation. Connection mounting slots (77) are further disposed on the left spring reel cover (72) and/or right spring reel cover (73) to cooperate with corresponding fixed structures of the hand-held locking clasp assembly, restricting relative rotation and enhancing assembly stability. Through this modular design, the hand-held locking clasp assembly (11) and strap reel module (12) can be flexibly connected and disconnected, facilitating maintenance, replacement of strap, or functional upgrades.

Operational Stages and Working Mechanisms

Stage 1: Preliminary Fixation and Strap Recovery. Before use, one end of the strap is secured to the spring-loaded reel winch (71) through the strap fixed axle (75). The user hangs the hook on the strap to a first fixed point and sets the control triggers (51) to the unlocked state. At this point, the locking pressure plate (43) is lifted, separating from the locking press pin (41), and the strap can pass freely through the hand-held locking clasp assembly (11). The user manually moves the hand-held locking clasp assembly to a second fixed point, with the strap continuously being pulled out from the strap reel module (12) and the closed-loop strap portion correspondingly increasing in length. After reaching the second fixed point, the user hangs the hook on the mounting point (31) to a fixed location. At this moment, the return spring within the spring-loaded reel winch (71) begins to function, providing passive recovery force for the excess strap that has been pulled out but not yet utilized, automatically retracting it into the interior of the reel. This process continues until all slack strap has been recovered, completing preliminary fixation with the strap no longer exposed.

Stage 2: Entering Locked State. After preliminary fixation is completed, the user releases the control triggers (51), allowing them to return to the non-depressed state. The reset spring (61) drives the control push rod (52) to recover its initial position, the locking pressure plate (43) automatically returns to proximity with the locking press pin (41) and re-clamps the strap. At this point, the friction self-locking mechanism (40) is activated, and the strap is subjected to multi-point, three-dimensional friction and engagement constraints, including contact between the protrusions on the surface of the locking press pin (41) and the strap, as well as three-dimensional contact between multiple conical columns on the pressure plate strap engagement wedge (45) and the strap. This multidimensional friction network provides strap holding capacity far superior to conventional single-point contact clasps, entering the locked state.

Stage 3: Progressive Tightening. In the locked state, if the user attempts to pull the strap from the strap reel module side, the contact between the strap and the pressure plate strap engagement wedge (45) and locking press pin (41) further deepens engagement, preventing easy strap sliding and exhibiting the unidirectional passage characteristic. When further tightening is required, the user alternatively pulls the strap from the mounting point (31) side. Because the locking pressure plate (43) adopts an eccentric positioning, the pulling force drives it to rotate around its pivot axis, temporarily reducing or separating the clamping force on the locking press pin (41), enabling the strap to pass. As the strap is drawn out, the closed-loop strap portion at the lower end is continuously pulled upward, its length continuously decreases, and further tightening of the secured cargo is achieved. By adjusting the magnitude and frequency of the pulling force, the user can precisely control the degree of tightening, achieving staged, non-damaging progressive tightening.

The friction locking capacity of the strap locking mechanism (40) derives from synergistic action of multiple aspects: the longitudinal friction surface of the locking press pin (41)—its outer surface is uniformly formed with protrusions that contact the strap to form longitudinal friction: the three-dimensional friction surface of the pressure plate strap engagement wedge (45)—composed of multiple uniformly distributed conical columns that cooperate with protrusions on the surface of the locking press pin (41) to form transverse and diagonal multi-point engagement: the continuous pressure of the reset spring (61)—ensuring the locking pressure plate (43) and locking press pin (41) maintain tight contact at all times, allowing the aforementioned friction surfaces to continuously function effectively. The organic combination of these three elements endows the strap with exceptional anti-slip capacity, preventing overall functional failure from wear of a single contact point, thereby substantially enhancing tightening stability and safety.

The function of the spring-loaded reel winch (71) in the present invention is explicitly limited, embodying the design philosophy of avoiding passive automatic strap-recovery risks. The spring-loaded reel winch (71) is effective for slack strap only in the unlocked state. After entering the locked state, the holding force exerted by the strap locking mechanism (40) on the strap completely counteracts the return spring's recovery force, preventing the spring from actively dragging the strap. This limitation ensures that the active force for cargo tightening originates from manual strap pulling by the user, rather than passive driving by the return spring. The passive recovery function of the spring-loaded reel winch (71) operates only during the preliminary fixation stage, automatically retracting excess strap into the interior of the reel, preventing strap exposure. This restricted design with explicit functional boundaries simultaneously solves the problem of exposed strap suffering wear and fundamentally avoids equivalency determination risks associated with passive automatic strap-recovery devices.

The dovetail guide post (21) and dovetail guide groove (22) design enables the hand-held locking clasp assembly (11) and strap reel module (12) to be easily connected and disconnected. During assembly, the dovetail guide groove (22) of the strap reel module (12) is inserted into the dovetail guide post (21) of the hand-held locking clasp assembly (11), achieving insertion through sliding engagement. Simultaneously, the sphere within the positioning pressure head (63) cooperates with the quarter-circle opening within the dovetail guide groove (22) to achieve positioning and retention against separation. Application Advantages: Through different specifications of strap reel modules (12), adaptation to different length and width strap requirements is achieved. Facilitating cleaning, maintenance, strap replacement, or functional upgrades enhances system versatility and flexibility. Safety Protection: Cooperation between the connection mounting slots (77) and corresponding fixed structures restricts relative rotation, enhancing assembly stability and ensuring unintended separation does not occur during transport.

The present invention achieves remarkable system advantages through organic cooperation between the hand-held locking clasp assembly (11) and strap reel module (12):

Preliminary Fixation Stage: The passive recovery capacity of the spring-loaded reel winch (71) is fully demonstrated, with excess strap automatically retracted into the reel interior, strap protection effects being significant and user experience being excellent.

Precision Tightening Stage: The friction self-locking mechanism (40) through multi-point contact and the eccentric characteristics of the locking pressure plate (43) provides precise, controllable progressive tightening process, avoiding the coarseness and uncontrollability of conventional single-point contact clasps.

Overall System Performance: The combination of two functional modules makes the complete system more efficient, safe, and user-friendly than using either a clasp or strap winder alone, fully exemplifying the creative combination effect of "1+1>2."

Maintenance Convenience: The modular interface design enables flexible connection and disconnection, substantially enhancing system maintenance, upgrade, and adaptation capability.

Component dimensions, profiles, and tolerances of the present invention may be selected according to practical requirements:

The dimensions of the housing and reel may be adjusted according to target mechanical strength, protection level, and ease of operation. The eccentric angle of the locking pressure plate (43) may be optimized according to desired release force and tightening precision. The spring preload within the spring-loaded reel winch (71) may be adjusted according to strap length and usage environment to achieve balance between preliminary fixation and progressive tightening. The fitting clearance between the dovetail guide post (21) and dovetail guide groove (22) may be precisely designed according to transport environmental protection and retention requirements. The elastic coefficient of the reset spring (61) may be selected according to requirements for locking force and reset speed, satisfying different application scenarios. All the above variations and combinations fall within the protection scope of the claims, exemplifying the flexibility and adaptability of the present invention's design.

Through the detailed description of the specific implementation embodiments provided above, the innovations of the present invention are evident:

Multi-point Contact Design of Friction Self-Locking Mechanism: Compared to conventional single-point contact clasps, this provides significantly enhanced locking capacity and anti-slip performance.

Explicit Functional Limitation of Spring-Loaded Reel Winch Recovery Function: Through a restricted, explicitly-bounded passive recovery mechanism, equivalency risks associated with passive automatic strap-recovery devices are avoided, while simultaneously solving the problem of exposed strap suffering wear.

Flexible Application of Modular Interface: Through the dovetail guide post and dovetail guide groove design, removable connection between the hand-held locking clasp and strap reel module is achieved, substantially enhancing system maintainability and versatility.

Creative Combination of Cooperative Mechanisms: The organic combination of two functional modules produces a "1+1>2" effect, enabling the complete system to achieve substantial enhancement in preliminary fixation, progressive tightening, strap protection, and user experience.

This design philosophy achieves transcendence over existing technology through structural innovation while fundamentally avoiding equivalency risks associated with known competitive patents, fully exemplifying the creativity and practical value of the present invention. The above description further illustrates the technical content of the present disclosure only through examples to enable readers to better understand, but does not mean that the implementation manner of the present disclosure is limited thereto. Any technical extension or re-creation made based on the present disclosure is protected by the present disclosure: the protection scope of the present disclosure is determined by the claims.

The invention claimed is:

1. A hand-held locking clasp assembly comprising:
   (a) a housing formed by left and right shell bodies and a mounting point positioned at a front end thereof;
   (b) a strap locking mechanism disposed within the housing, the strap locking mechanism comprising:
   (1) a locking press pin rotatably mounted via a press pin bearing and having an outer surface uniformly formed with protrusions configured to form a multi-point friction surface upon contact with a strap;
   (2) a locking pressure plate pivotally supported by a pressure plate guide post and having a lower surface formed with a pressure plate strap engagement wedge comprising a plurality of uniformly distributed conical columns, the locking pressure plate cooperating with the locking press pin to jointly clamp a strap passing therebetween in a locked state and enabling unidirectional passage of the strap, and permitting free passage of the strap in an unlocked state;
   (3) a reset spring biasing the locking pressure plate toward the locking press pin to maintain tight contact in a static state; and
   (c) a linkage and control mechanism configured to switch between the locked and unlocked states, the linkage and control mechanism comprising:
   (1) a linkage pin disposed within a linkage guide slot of the housing;
   (2) a push rod linkage plate cooperating with the linkage pin;
   (3) a control push rod passing through the push rod linkage plate and partially protruding from a control slide groove of the housing; and
   (4) control triggers positioned at both ends of the control push rod;
   wherein operating the control triggers drives the locking pressure plate to separate from or press toward the locking press pin to complete state switching between locked and unlocked conditions.

2. The hand-held locking clasp assembly according to claim 1, wherein the locking pressure plate is eccentrically positioned such that upon pulling an upper end of the strap, it rotates about its pivot axis to release or re-clamp the strap.

3. The hand-held locking clasp assembly according to claim 1, wherein the push rod linkage plate has a circular slot structure with a circular hole at one end configured to engage with the control push rod, and a semicircular hole at the other end configured to nest with semicircular ends of the linkage pin to achieve oscillating linkage motion.

4. The hand-held locking clasp assembly according to claim 1, wherein the positioning pressure head is mounted within the pressure head installation slot of the housing, the positioning pressure head internally comprising a spring with a sphere positioned at an opening thereof, the spring continuously biasing the sphere to provide positioning indication and cooperative positioning for assembly.

5. The hand-held locking clasp assembly according to claim 1, wherein the press pin bearing is disposed on a press pin guide post to provide support and friction reduction as the locking press pin rotates.

6. The hand-held locking clasp assembly according to claim 1, wherein a bolt is fixedly mounted at a central portion of the mounting point, the bolt being provided with a hook configured to engage with a fixed point for hanging purposes.

7. The hand-held locking clasp assembly according to claim 1, wherein the control triggers are symmetrically disposed along both sides of the housing and externally exposed from the control slide groove to enable single-handed operation and corresponding indication with an external status indicator.

8. A modular tensioning device comprising:
   (a) a hand-held locking clasp assembly as recited in claim 1, having a dovetail guide post disposed at a tail end of the housing;
   (b) a strap reel module removably connected to the hand-held locking clasp assembly, the strap reel module comprising:
   (1) a left spring reel cover and a right spring reel cover;
   (2) a spring-loaded reel winch disposed therebetween, the spring-loaded reel winch being mounted on a spring reel arbor shaft and provided with a strap fixed axle for securing one end of the strap and a spring reel retaining clip for securing a return spring, wherein the return spring is fixed within the spring-loaded reel winch and a strap is uniformly wound around an outer periphery thereof;

(3) dovetail guide grooves formed at front ends of the left and right spring reel covers, each configured to cooperate with the dovetail guide post, each dovetail guide groove further defining a quarter-circle opening for positioning structure cooperation;

wherein the spring-loaded reel winch is limited to provide recovery force for slack strap only when the hand-held locking clasp assembly is in an unlocked state, and the recovery force is insufficient to overcome the holding force exerted by the strap locking mechanism on the strap in the locked state, thereby enabling a user to pull the strap and complete tightening of cargo under the action of the strap locking mechanism.

9. The modular tensioning device according to claim 8, wherein an inner surface of the left spring reel cover is provided with a spring reel arbor shaft, the spring-loaded reel winch being coaxially rotatably mounted on the spring reel arbor shaft.

10. The modular tensioning device according to claim 8, wherein dovetail guide grooves formed at front ends of the left spring reel cover and the right spring reel cover each define a quarter-circle opening, and upon assembly, the sphere from the positioning pressure head of the hand-held locking clasp assembly elastically engages within the quarter-circle opening to achieve positioning and retention against separation.

11. The modular tensioning device according to claim 8, wherein the strap fixed axle disposed on the spring-loaded reel winch is configured to fix one end of the strap, and the spring reel retaining clip is configured to limit the return spring within the interior of the spring-loaded reel winch to maintain spring preload and ensure the strap is uniformly wound around the outer periphery of the spring-loaded reel winch.

12. The modular tensioning device according to claim 8, wherein connection mounting slots are disposed on the left spring reel cover and/or the right spring reel cover to cooperate with corresponding fixed structures of the hand-held locking clasp assembly to restrict relative rotation and enhance assembly stability.

13. The modular tensioning device according to claim 8, wherein when the hand-held locking clasp assembly is switched to an unlocked state, the recovery force provided by the spring-loaded reel winch for slack strap causes excess strap to be retracted into a cavity formed between the left spring reel cover and the right spring reel cover to achieve preliminary fixation without actively tightening cargo.

14. The modular tensioning device according to claim 8, wherein an outer surface of the housing of the hand-held locking clasp assembly displays a locked/unlocked state indicator corresponding to the control triggers to indicate the current working state.

15. The modular tensioning device according to claim 8, wherein a free end of the strap is provided with a hook configured to engage and cooperate with a fixed point of the mounting point or a fixed object for hanging purposes.

* * * * *